United States Patent [19]

Suzuki et al.

[11] Patent Number: 4,964,074
[45] Date of Patent: Oct. 16, 1990

[54] IN-CIRCUIT EMULATOR

[75] Inventors: Noriyuki Suzuki; Hironobu Asai, both of Tokyo, Japan

[73] Assignee: Ando Electric Co., Ltd., Tokyo, Japan

[21] Appl. No.: 306,252

[22] Filed: Feb. 2, 1989

Related U.S. Application Data

[63] Continuation of Ser. No. 30,201, Mar. 24, 1987, abandoned.

[30] Foreign Application Priority Data

Mar. 31, 1986 [JP] Japan .................................. 61-73648

[51] Int. Cl.[5] ...................... G06F 9/455; G06F 13/00
[52] U.S. Cl. ................................ 364/900; 364/927.81; 364/942.51
[58] Field of Search ... 364/200 MS File, 900 MS File

[56] References Cited

U.S. PATENT DOCUMENTS

| 4,025,906 | 5/1977 | Riikonen | 364/200 |
| 4,231,087 | 10/1980 | Hunsberger et al. | 371/16 |
| 4,633,417 | 12/1986 | Wilburn et al. | 364/481 |
| 4,674,089 | 6/1987 | Poret et al. | 364/200 |

Primary Examiner—Eddie P. Chan
Attorney, Agent, or Firm—Flynn, Thiel, Boutell & Tanis

[57] ABSTRACT

An in-circuit emulator comprising CPUs (microprocessors) of different types, portions of constituent elements thereof being different from each other, a control circuit connected to the CPUs and an external actual apparatus for controlling the operation of the in-circuit emulator, and an identifier circuit connected to the CPUs and the control circuit for identifying differences among the CPUs based upon feature signals from the CPUs inputted thereinto, the in-circuit emulator switching the control circuit to an operation mode suited to the CPU by making use of an output from the CPU identifier circuit.

4 Claims, 2 Drawing Sheets

FIG. 1 (PRIOR ART)
| PIN NO. | CPU 1 | CPU 2 |
|---------|-------|-------|
| 10 ~ 17 | AD15 ~ AD8 | A15 ~ A8 |
| 51 | $\overline{HBE}$ | 1 |
FIG. 2 (PRIOR ART)
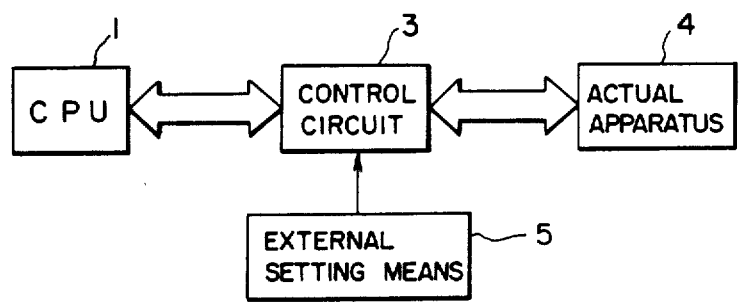
FIG. 3
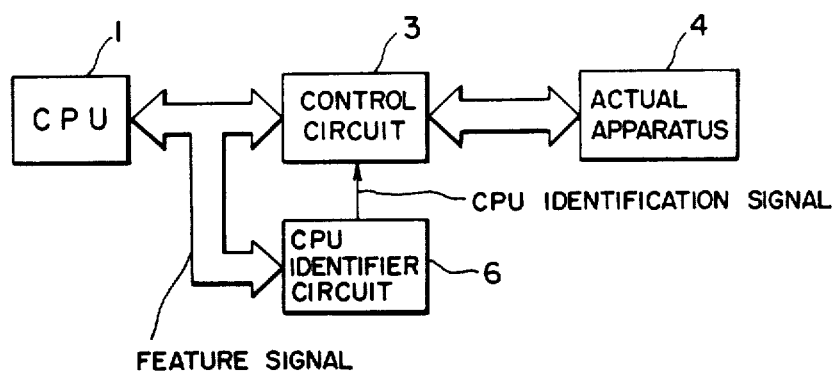

IN-CIRCUIT EMULATOR

This application is a continuation of U.S. Ser. No. 07/030 201, filed Mar. 24, 1987, now abandoned.

BACKGROUND OF THE INVENTION

1. Field of the Invention

The present invention relates to an in-circuit emulator, and more particularly to a CPU identifier circuit of such an in-circuit emulator adapted to select operation of a control circuit for different types of microprocessors (hereinafter, referred to as a CPU) different in portions of constituent elements thereof from each other.

2. Description of the Prior Art

Some CPUs have substantially the same package signal and pin arrangement.

CPUs each having a data bus of 16 bits of 8 bits are typically employed, which CPUs resemble each other from the viewpoint of their appearances and electric properties with only slight differences among their control signals associated therewith.

FIG. 1 here shows a table which lists different portions among those similar CPUs when they are divided into two groups: CPU 1 and CPU 2.

pins 10 to 17 of the CPU 1 correspond to AD 15 to AD 8 in the table.

AD 8 to AD 15 serve as an address bus and a data bus by time sharing because of the data bus being contrived to be 16 bits, and furthermore serve for input/output operation when the data bus is operated.

The data bus is controlled by making AO "0" when the lower-rank data bus (D 0 to D 7) is employed, while it controlled by making HBE of a 51 pin "0" when the higher-rank data bus (AD 8 to AD 15) is employed.

Since the data bus of the CPU 2 is adapted to have its width of 8 bits, those pins of from 10 to 17 serve only as outputs of the address bus (A 15 to A 8).

In addition, the CPU 2 is not in need of controlling higher- and lower-rank data buses, and hence the pin 51 is fixed to "1".

CPUs 1 and 2 respectively include 68 pins among which nine pins are different, as shown in FIG. 1.

Accordingly, in-circuit emulators corresponding to those CPUs 1 and 2 can be united into one emulator with ease.

The in-circuit emulator here means one connected with an actual apparatus, instead of a CPU of the actual apparatus, for checking a memory and I/O ports of the actual apparatus and for debugging a program thereof.

Since a signle in-circuit emulator can correspond to a plurality of CPUs as described above, the emulator can conveniently be operated, and the development and fabrication costs of the in-circuit emulator per CPU can be reduced.

Such an in-circuit emulator can be realized by using as a CPU involved in the in-circuit emulator an object CPU.

Thereupon, operation of a peripheral control circuit of the CPU must be switched too, depending on the object CPU.

A block diagram of a portion of such a prior in-circuit emulator related to the present invention is illustrated in FIG. 2.

In the same figure, designated at 1 is a CPU, 3 is a control circuit, 4 is an actual apparatus, and 5 is external setting means.

The concerning in-circuit emulator includes the CPU 1, control circuit 3, and external setting means 5 shown in FIG. 2.

For the CPU 1, a CPU of the same type as that involved in the actual apparatus 4 is employed.

Conventionally, a manual switch and a software for control, etc., were employed as the external setting means 5 to switch the operation modes of the control circuit 3. However, the prior external setting means 5 is not only complicated in its operation, but erroneous operation of the external setting means 5 may sometimes cause, although the CPU 1 of FIG. 1 for example is to be employed as the emulator CPU, this emulator CPU to be set as the CPU 2 of FIG. 1. There is produced as a result a problem that this situation prevents the in-circuit emulator from operating correctly and produces damages to circuit elements.

SUMMARY OF THE INVENTION

In view of the drawbacks of the prior techniques, it is an object of the present invention to provide an in-circuit emulator including a CPU identifier circuit, the CPU identifier circuit electrically identifying the type of a CPU involved in the in-circuit emulator and providing a result of the identification to the outside as an identification signal, the in-circuit emulaotor switching operation modes of a control circuit based upon the output from the CPU identifier circuit.

To achieve the above object, and in-circuit emulator according to the present invention includes: CPUs of different types, portions of constituent elements thereof being different from each other; a control circuit connected to the CPUs and an external actual apparatus for controlling the operation of the in-circuit emulator; and an identifier circuit connected to the CPUs and the control circuit for identifying differences among the CPUs based upon feature signals from the CPUs inputted thereinto, the in-circuit emulator switching the control circuit to an operation mode suited to the CPU by making use of an output from the CPU identifier circuit.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 exemplarily shows a table wherein different signal pins of different CPUs are listed, the CPUs being different partly in constituent elements thereof;

FIG. 2 is a block diagram illustrating a prior in-circuit emulator;

FIG. 3 is a block diagram illustrating an embodiment of an in-circuit emulator according to the present invention.

DESCRIPTION OF THE PREFERRED EMBODIMENT

Figure 4:
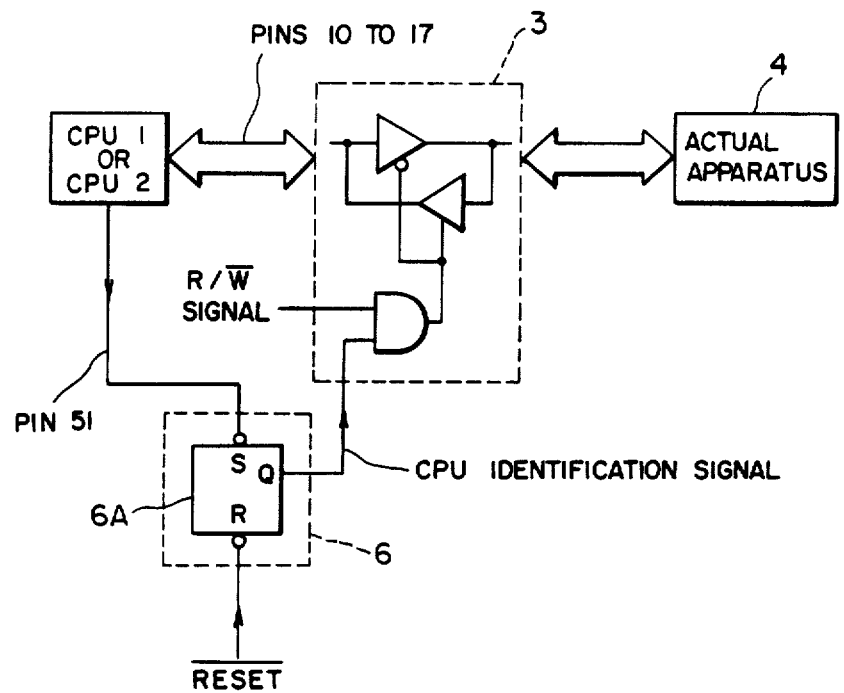
FIG. 4 is a circuit block diagram illustrating the embodiment of FIG. 3.

An embodiment of an in-circuit emulator according to the present invention will be described with reference to the accompanying drawings.

Referring first to FIG. 3, a block diagram of the in-circuit emulator of the present invention is illustrated.

As illustrated in the same figure, designated at 6 is an identifier circuit, and 1, 3 and 4 are the same as those illustrated in FIG. 2.

The identifier circuit 6 is adapted to receive a feature signal from the CPU 1, to judge the type of the CPU 1 therefrom, and to transmit a resulting identified signal to the control circuit 3 for controlling the operation modes under any of which the control circuit 3 is operated.

Referring then to FIG. 4, illustrating a circuit block diagram of the embodiment of FIG. 3, the CPUs 1 and 2 shown in FIG. 1 are exemplarily employed as the emulator CPU.

For the feature signal representative of the CPU 1, a signal at a pin 51 of the CPU 1 shown in FIG. 1 is emplyed.

The pin 51 stays at all times on "1" in the CPU 1, while it becomes "0" in the CPU 2 without fail with access to even addresses thereof. Accordingly, it surely gets to be "0" by the first memory access after the reset state thereof is released, to result in a difference between the CPUs 1 and 2. Provided this situation of the pin 51 is connected to a set input of a flip-flop 6A in the identifier circuit 6, which flip-flop is previously cleared by a reset signal, the flip-flop 6A is set at once only with the CPU 1.

An output from this flip-flop 6A is transmitted as a CPU identification signal to the control circuit 3.

The control circuit 3 receiving such a CPU identification signal controls pins 10 to 17 to an actual apparatus 4 to be I/O terminals when the emulator CPU is the CPU 1 and the identification signal is "1".

The control circuit 3 furthermore controls those pins of from 10 to 17 to the actual apparatus 4 to be output terminals when the CPU is the CPU 2 and the identification signal is "0".

According to the present invention, as described above, in the in-circuit emulator corresponding to different types of CPUs each having their constituent elements being different partly in portions of the elements, operation modes of the control circuit are switched on the basis of an output from the CPU identifier circuit, whereby no fear of setting by mistake those modes is produced to thereby assure an in-circuit emulator simplified in its operation with high reliability.

Although a certain preferred embodiment has been shown and described, it should be understood that many changes and modifications may be made therein without departing from the scope of the appended claims.

What is claimed is:

1. An in-circuit emulator comprising:
   (a) a selected CPU which is one of a plurality of CPUs (microprocessors) of different types, portions of constituent elements thereof being different from each other and producing a feature signal which includes a control signal output by each said CPU as an inherent part of normal operation thereof and which is different for each said CPU;
   (b) a control circuit which controls emulation of said selected CPU, which is connected to said selected CPU and to an external actual apparatus having a circuit portion which is controlled by said feature signal, and which has a plurality of different emulation modes which each correspond to a respective said CPU; and
   (c) identifier circuit means connected to said selected CPU and to said control circuit for identifying said selected CPU based upon said feature signal therefrom and for then producing an output signal which corresponds to said selected CPU, said control circuit having means for automatically switching it to a respective said emulation mode corresponding to said selected CPU in response to said output from said identifier circuit means.

2. An in-circuit emulator according to claim 1, wherein said identifier circuit means includes a flip-flop circuit which records said feature signal.

3. An in-circuit emulator according to claim 2, wherein there are two different types of said CPUs, wherein said feature signal always has a first logic value when produced by a first said type of CPU and assumes a second logic value when produced by a second said type of CPU, and wherein said flip-flop circuit has a set input coupled to said feature signal and a reset input coupled to a system reset signal.

4. An in-circuit emulator according to claim 3, wherein each said CPU is disposed in a respective package, said packages having a common predetermined configuration which includes a plurality of pins, each said CPU outputting said feature signal thereof on a predetermined one of said pins in said predetermined package configuration.

* * * * *